United States Patent [19]

Yamamoto et al.

[11] Patent Number: 4,610,811
[45] Date of Patent: Sep. 9, 1986

[54] IODINE-CONTAINING CONDUCTIVE RESIN COMPOSITION

[75] Inventors: Takakazu Yamamoto; Sadaaki Yamamoto; Sadao Kobayashi; Hiroshi Sukawa, all of Yokohama, Japan

[73] Assignee: Mitsui Toatsu Chemicals, Inc., Tokyo, Japan

[21] Appl. No.: 708,880

[22] Filed: Mar. 5, 1985

[30] Foreign Application Priority Data

Mar. 7, 1984 [JP] Japan .................................. 59-41890
May 17, 1984 [JP] Japan .................................. 59-97423

[51] Int. Cl.$^4$ ............................................. H01B 1/06
[52] U.S. Cl. .................................... 252/511; 252/500; 252/502; 524/80; 524/500; 525/356; 429/212; 429/213

[58] Field of Search ...................... 252/502, 511, 500; 524/80, 500; 525/355, 356; 429/212, 213, 199

[56] References Cited

U.S. PATENT DOCUMENTS 4,461,860  7/1984  Vives ..................................... 524/80
4,491,605  1/1985  Marurek et al. ..................... 252/500
4,499,007  2/1985  Elie et al. .............................. 525/356

*Primary Examiner*—Josephine L. Barr
*Attorney, Agent, or Firm*—Fisher, Christen & Sabol

[57] ABSTRACT

An iodine-containing conductive resin composition, said composition obtained by dispersing a carbon in a complex adduct of iodine and a polymer capable of forming a complex adduct with iodine and/or a mixture obtained by dispersing iodine in said polymer.

3 Claims, 9 Drawing Figures

IODINE-CONTAINING CONDUCTIVE RESIN COMPOSITION

FIELD OF TECHNOLOGY

This invention relates to an iodine-containing conductive resin composition comprising iodine, a polymer capable of forming a complex adduct with iodine, and a carbon.

BACKGROUND TECHNOLOGY

Iodine is a substance that readily becomes an anion. It thus is one of the substances that is suitably used as an active material of positive electrode. Iodine is known to form charge transfer complexes with various organic compounds. The charge transfer complexes of iodine are composed of iodine (acceptor) and various electron donating organic compounds (organic donor component). The known electron donating compounds include the heterocyclic compounds such as phenothiazine and carbazole and the polyaromatic compounds such as pyrene and perylene and such organic polymers as poly-2-vinylpyridine, polyethylene, polyacetylene, poly-p-phenylene, polythienylene, polypyrrole, polyaniline, polyvinyl alcohol, polypropylene and polystyrene.

It was further found by us that such organic polymers as the urea/formaldehyde resins, polyurethane, polyacrylonitrile, polyamides, poly(meth)acrylamide and polyethers are also effective as the organic donor component.

In all instances there is seen a great rise in the conductivity of these charge transfer complexes as compared with that of the original starting simple substances.

Of these complexes, the poly-2-vinylpyridine/iodine complex is already being used as the positive electrode materials of lithium cells. On the other hand, in recent years extensive development of such compounds as polyacetylene, polypyrrole, polyaniline, poly-p-phenylene and polythienylene, as conductive compounds, is being carried out. It is known that there is an enhancement in the conductivity of these compounds by doping them with iodine. There are however various drawbacks such as that such compounds being easily oxidized by oxygen are not stable, that their processability is poor, etc.

The iodine charge transfer complex (hereinafter referred to as iodine complex or simply as complex adduct) brings about a great enhancement in the conductivity of such polymers as the polyamides, polyvinyl alcohol, etc., which per se are insulators. The following problems, however, arise when these iodine complexes are to be applied to their use as a conductor. In first place, the conductivity of the iodine complex or complex adduct shows a great fluctuation depending upon the amount of iodine contained, especially in the range where the content is small, with the consequence that difficulty is experienced in its control. Secondly, a considerably large amount of iodine, for example 70 to 80% by weight, must be incorporated in the polymer for obtaining one having a high conductivity. It is not necessarily an easy matter to incorporate the iodine in such a high concentration. Furthermore, a complex adduct in which great fluctuations take place in the conductivity depending upon the content of iodine is objectionable for such applications where fluctuations in the content of iodine inevitably take place at the time of their use. For example, take the case where the complex adduct is used as positive electrode materials. Since the iodine would become separated from the complex adduct as the discharge proceeds, the positive electrode materials would gradually lose its conductivity. As a consequence, a marked increase takes place in the resistance of the positive electrode materials as the discharge proceeds, and this brings about a great reduction in the electromotive force of the cell.

On the other hand, when positive electrode materials composed of this charge transfer complex is used in a secondary cell, a major part of the iodine becomes separated from the positive electrode materials as a result of the discharge. Hence, the positive electrode material becomes an insulator. This becomes a crucial defect in the case of a secondary cell, for it becomes impossible to recharge it. This is a problem that inevitably occurs in the case where the iodine complex of the polymer used is one in which the polymer is by nature an insulator, such as the polyamides, polyacrylonitrile, polyvinyl alcohol, polyethers and poly-2-vinylpyridine.

Extensive researches by us with the view of overcoming these shortcomings of the charge transfer complexes led to the discovery that the foregoing shortcomings could be overcome by incorporating a carbon in the complex. The present invention was thus perfected.

DISCLOSURE OF THE INVENTION

Figure 1:
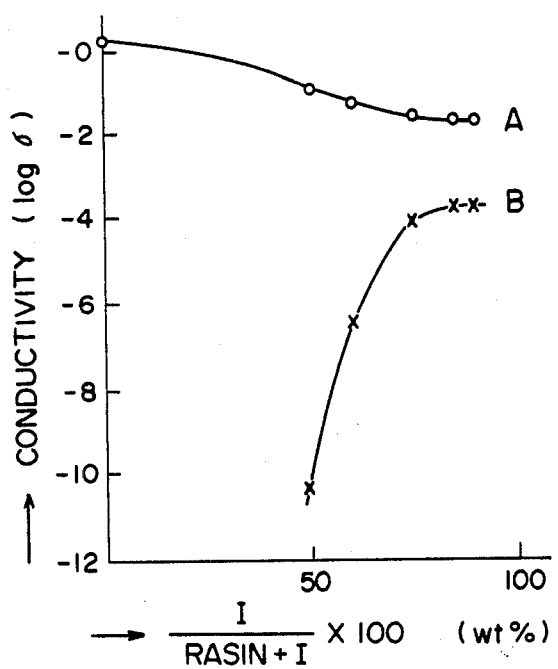
FIGS. 1 to 8 are graphs showing the characteristics of the conductive resin composition of the present invention.

There is provided according to this invention an iodine-containing conductive resin composition that is obtained by dispersing a carbon in a complex adduct of iodine and a polymer capable of forming a complex adduct with iodine and/or a mixture obtained by dispersing iodine in said polymer.

As the polymer capable of forming a complex adduct with iodine that is used to form the conductive resin composition of this invention, included are preferably polyacrylamide, polymethacrylamide, ureaformaldehyde resins, polyvinyl alcohol, polyvinyl acetate, and such aliphatic polyamides as nylon-6, nylon-6,6, nylon-12, nylon-6,9 and nylon-6,10, as well as the wholly aromatic polyamides such as Kevlar (a tradename for a product of E. I. du Pont de Nemours and Co.), polyethylene, polypropylene, polystyrene, polyurethane, melamine resins, polyethers, polyacrylonitrile, Barex (a tradename of The Standard Oil Co. (Ohio)) resins, polymethyl methacrylate, polytetramethylene ether, polyvinylpyrrolidone, poly-4-vinylpyridine, poly-2-vinylpyridine and poly-N-vinylcarbazole. In addition, it goes without saying that the aforementioned known polymers may also be used. These may be used in blend of two or more, or copolymers of these polymers may also be used.

The usual prodecure for preparing the conductive resin composition of this invention will now be described.

One of the preferred methods is carried out in the following manner.

First, prior to adding the iodine, carbon is added and dispersed in the polymer that is capable of forming a complex adduct with iodine to form in advance a polymer/carbon mixture. This is performed by say a method comprising dissolving a prescribed amount of the polymer in a solvent, then mixing carbon therein and thoroughly mixing the mixture until it becomes a slurry, followed by removing the solvent, or a method of directly mixing and dispersing the carbon in the polymer without using a solvent. Iodine is then added to the thus obtained polymer/carbon mixture to form a complex adduct with the polymer or a mixture in which the former is dispersed in the latter. The iodine used in the resin composition of this invention may be the usual iodine of solid or flaky form, which may be used as such or after purification as required. While any method may be employed in adding the iodine to the mixture, preferred are such methods as follows:

(i) A method which comprises introducing an iodine vapor into a closed vessel containing the polymer/carbon mixture to cause their contact and thus the addition and adsorption of the iodine on the mixture;

(ii) A method of causing the addition and adsorption of the iodine on the polymer/carbon mixture in the liquid phase by dipping the latter in an iodine-containing solution of say benzene or acetone;

(iii) A method of mechanically kneading the iodine directly into the polymer/carbon mixture; and (iv) A method of heating the polymer/carbon mixture to a molten state in a closed vessel and then mixing and dispersing the iodine therein.

The methods described hereinabove are those in which the conductive composition is formed by a procedure comprising first forming a polymer/carbon mixture and then adding the iodine. It is of course possible to employ another method, i.e., a method of preparing the conductive composition in a single step by adding the carbon and the iodine to a prescribed amount of the polymer at the same time followed by mixing the components to a dispersed state in a closed vessel, preferably in a molten state. There are imposed no particular restrictions at this time as to the order in which the materials to be added for mixing are added. In short, no restrictions are imposed so long as it is possible to form a composition in which carbon is substantially dispersed in a complex adduct of a polymer and iodine and/or an iodine-dispersed mixture.

The iodine is contained in the resin composition in an amount of 1 to 95% by weight, and preferably 10 to 90% by weight, based on the total weight of the polymer and iodine.

While any of the various methods for producing the iodine-containing conductive resin composition of this invention such as described hereinbefore can be employed, it is preferred that a specific method be chosen depending upon the compositional ratio of the intended resin composition. For example, in producing a composition whose iodine content is not greater than about 50% by weight, the intended product can be readily obtained by such method as that of dipping the polymer/carbon mixture in a solution containing iodine to cause the addition and adsorption of iodine on the mixture or that of mechanically kneading the iodine directly into the mixture. However, when it is required that the resin composition have an especially high iodine content, for example at least 60% by weight, difficulty will be experienced in producing the composition by these methods. Hence, when it is necessary to obtain such resin composition of high iodine content exceeding 60% by weight, preferred are such methods as that of rendering the polymer/carbon mixture into a molten state by heating it in a closed vessel followed by mixing and dispersing the iodine therein or that of charging the iodine, polymer and carbon into a closed vessel concurrently and then heat-melting the mixture.

When such a heat-melting procedure is employed, it is preferred for promoting the reaction that the heat-melting operation be carried out in an atmosphere substantially of iodine vapor. While various methods can be employed for carrying out such an operation, the simplest method is that comprising charging a vessel with the iodine, polymer and carbon followed by evacuating the vessel thoroughly and thereafter heat-treating the contents under reduced pressure. It should suffice that the degree of vacuum is from 0.1 to 30 torrs, preferably 0.5 to 10 torrs, and still more preferably 1 to about 5 torrs. When the heat-treatment is performed under such a reduced pressure, an iodine vapor is evolved to fill the space of the vessel corresponding to its partial pressure, with the consequence that the melting treatment is carried out in an atmosphere substantially of iodine vapor. It is of course not only possible to simply heat the vessel but also to introduce an iodine vapor into the vessel.

As a still more preferred mode of practicing the invention, the following procedure can be employed. After completion of the charging of the components, the air (especially oxygen) in the reactor is purged with nitrogen. Then, after cooling the inside of the reactor to say about $-60°$ C., the inside of the reactor is evacuated under reduced pressure to remove the nitrogen. The reactor is then returned to room temperature, following which the heat-melting operation is carried out as described hereinabove. Any heating temperature may be used so long as it is one in the range at which an iodine vapor is effectively evolved and there is the formation of at least a molten liquid phase in the system. Hence, a temperature equal to or higher than the melting point of iodine will do. But the temperature may also be one lower than such a temperature, i.e., when the temperature is one at which the polymer dissolves, a temperature equal to or higher than the melting point or softening point of the polymer will do. Actually, in most instances the formation of the molten liquid phase takes place when the heating is performed at a temperature lower than both the melting points of the iodine and the polymer. This is believed to be for the reason that a complex is formed locally between the iodine and the polymer at that portion at which they make contact and that the melting point of said iodine complex is lower than melting points of iodine and the polymer. Usually, a heating temperature of 100° to 180° C. will suffice.

Once the formation of the molten liquid phase takes place, the solid phase remaining in the liquid phase becomes dispersed, and not only the complex-forming reaction is accelerated, but also simultaneously the iodine, remaining portion of the polymer and carbon, which have not participated in the reaction, become completely dispersed, and there is thus formed the iodine-containing conductive resin composition of this invention.

In carrying out the heat-melting treatment, at times it is preferred to employ conjointly mechanical agitation to an extent that does not break the structure of the carbon.

Thus, it becomes possible by employment of a method of mixing and dispersing in a molten state such as described hereinbefore, to readily produce with good efficiency a conductive resin composition having a high content of iodine of at least 60% by weight, further at least 70% by weight, still further at least 80% by weight, and at times at least 90% by weight.

The carbon to be added to the resin composition of this invention include carbon black, acetylene black, graphite and Ketjen Black (a trademark of AKZO Chemie). Preferably used are those in an easily dispersible form such as a powder, flakes and short fibers. While the amount in which the carbon is used will vary depending upon its type, usually it is preferred to use it in an amount ranging from 0.5 to 60% by weight based on the total weight of the polymer and carbon. For example, it is 0.5 to 50% by weight for Ketjen Black and 0.5 to 40% by weight for pulverized graphite. If the amount added is less than the lower limit of these ranges, the effect of the addition is small, and especially in those ranges where iodine content is lower, there is an abrupt drop in conductivity. On the other hand, the use of carbon in excess of the foregoing ranges not only brings about no further substantial enhancement of the effects of the addition, but also the moldability of the composition suffers. In the case of Ketjen Black, for example, it is preferably used in an amount of 5 to 40%, and especially 10 to 30% by weight.

The resin composition of this invention can be mass-produced at especially low cost and finds application conveniently to the all-purpose resins having superior processability. When the present invention is applied to the iodine charge transfer complexes of such polymers as polyacrylonitrile, polyethers, polyvinyl alcohol, polyamides and polyurethane, practical effects are greatly demonstrated.

Molded articles of any desired shape such as films, sheets, tubes, pipes, etc., can be obtained from the resin composition of this invention by employing the known methods of molding resins such as extrusion, injection, compression, blow and transfer molding and calendering techniques. It is also possible to form a conductive coating by dissolving the invention resin composition in a suitable solvent and using the resulting solution as a conductive surface coating material. Again, it may be pelletized and used as blending agent for imparting conductivity to other resins.

In the conductive resin composition of this invention, a major part of the iodine in the polymer forms a complex adduct therein. It however goes without saying that not all of the iodine must be present as a complex adduct. A part or all of the iodine may also be simply dispersed in the polymer in free form. In short, it is only required that the iodine is substantially included in the polymer.

In the case of the iodine-containing conductive resin composition of this invention, its conductivity does not decline even when the iodine becomes separated. For example, when this composition is used as positive electrode materials of a cell, the electromotive force of the cell is maintained constant even when the discharge of the cell proceeds.

The invention composition can be used as positive electrode materials of a cell in say the following manner. Using as the positive electrode the composition molded into a suitable shape and as the negative electrode a metal such as lithium, aluminum, magnesium, zinc or cadmium, contact of the electrodes is achieved by interposing an ion conductor between the electrodes. When the invention composition is to be employed with a wet cell containing an aqueous solution, contact between the positive electrode composed of this composition and the metallic negative electrode can be had through the intermediary of an electrolyte in liquid form. In this case, in addition to the electrolyte formed by the discharge, the electrolytic solutions such as ammonium chloride, sodium chloride, zinc chloride, sodium bromide, potassium bromide, lithium iodide and zinc iodide etc. may also be used as auxiliary electrolytes. Further, for preventing self discharge, it is convenient to sandwich a porous separator between the two active substances.

On the other hand, when the invention composition is to be employed with the wet nonaqueous solution cells, for example those which use lithium or sodium as the negative electrode, a solvent of small activity such as propylene carbonate or gamma-butyl lactone is desirably used. Again, a supporting member consisting of a porous material having a large liquid holding capacity such as a mat of short glass fibers is conveniently used after having been impregnated with a metal iodide in solution in these solvents. A porous material impregnated with an electrolyte in this manner can be used as such in assembling a cell by interposing it between a negative electrode and a positive electrode made from the composition of the present invention.

Further, in applying the invention composition to a solid electrolytic cell, the contact between the positive electrode and the negative electrode metal can be accomplished through the intermediary of a solid electrolytic film.

BEST MODES FOR CARRYING OUT THE INVENTION

EXAMPLE 1

Figure 9:
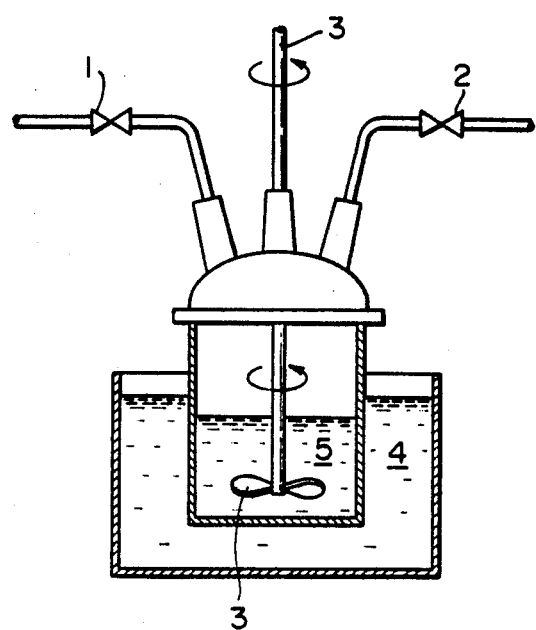
FIG. 9 is a sectional view showing an apparatus suitable for use in producing the conductive resin composition of this invention.

A 4-necked 150-ml flask shown in FIG. 9 was charged with 32 g of powdery polyacrylonitrile having an average molecular weight of 152,000, 8 g of Ketjen Black KB-EC (a trademark of AKZO Chemie) and 80 g of finely divided iodine. The charge was then directly heated at a temperature of 155° C. and normal atmospheric pressure with stirring. It required 20 hours to achieve complete dispersion in a melt-blended state.

The resulting iodine-containing resin composition had a conductivity $\sigma$ (S cm$^{-1}$) at room temperature of $3 \times 10^{-2}$ S cm$^{-1}$, and the iodine content in the composition was 65% by weight.

EXAMPLE 2

A 4-necked 150-ml flask shown in FIG. 9 was charged with 32 g of powdery polyacrylonitrile having an average molecular weight of 152,000, 8 g of Ketjen Black KB-EC and 80 g of finely divided iodine.

The air in the flask of FIG. 9 was purged with nitrogen introduced from inlet 1 of the flask. In its closed state this reactor was then immersed in a dry ice-acetone solution to cool i to a temperature of about −60° C. The evacuating valve 2 was then opened and the pressure was reduced as rapidly as possible to about 1 to 5 torrs, after which the evacuating valve 2 was closed. The temperature of the reactor was returned to room temperature, and it was then placed in an oil bath to heat it gradually up to a temperature of 155° C. When the polymer and iodine started to form a complex adduct, a partially molten state set in. The stirring was started at this point and continued for about 7 hours at a temperature of 150° C. After completion of the reaction, the temperature was returned to room temperature. There was thus obtained a black iodine-containing conductive resin composition in the reactor.

The conductivity $\sigma$ (S cm$^{-1}$) of this composition at room temperature (25° C.) was $5 \times 10^{-2}$ S cm$^{-1}$, and the iodine content in the composition was 66% by weight.

EXAMPLE 3

A 150-ml 4-necked flask shown in FIG. 9 was charged with 12 g of powdery nylon-6 (a product of Toray Industries, Inc.), 2.4 g of Ketjen Black KB-EC and 120 g of finely divided iodine. After carrying out the pretreatment as in Example 2, the flask reactor was placed in an oil bath, where it was heated for 5 hours at a temperature of 120° C. with stirring to give a black composition. The conductivity $\sigma$ (S cm$^{-1}$) at room temperature (25° C.) of this composition was $2 \times 10^{-2}$ S cm$^{-1}$, and the iodine content was 88% by weight.

EXAMPLE 4

Twelve grams of powdery nylon-6, 2.4 g of Ketjen Black KB-EC and 120 g of finely divided iodine were placed in a 150-ml 4-necked flask shown in FIG. 9 and pretreated as in Example 3. The flask reactor was then heated at 120° C. In Example 3 the heating was carried out with stirring, but in this example stirring was not performed, and the iodine was allowed to disperse naturally. For obtaining a complete melt-blend, it required 20 hours at 120° C.

The conductivity $\sigma$ (S cm$^{-1}$) at room temperature (25° C.) of the resulting composition was $9 \times 10^{-3}$ S cm$^{-1}$, and the content of iodine was 88% by weight.

EXAMPLE 5

24 g of powdery polyvinyl alcohol (a product of Kuraray Co., Ltd.), 2.4 g of Ketjen Black KB-EC and 100 g of finely divided iodine were charged to a 150-ml 4-necked flask shown in FIG. 9 and were pretreated as in Example 2. The flask reactor was then placed in an oil bath, where it was heated for 5 hours at a temperature of 150° C. with stirring to yield a black iodine-containing conductive resin composition. This composition had a conductivity $\sigma$ (S cm$^{-1}$) at room temperature (25° C.) of $9 \times 10^{-2}$ S cm$^{-1}$, while its iodine content was about 78% by weight.

EXAMPLE 6

A 150-ml 4-necked flask shown in FIG. 9 was charged with 12 g of powdery polytetramethylene ether having a reduced viscosity, as measured on its 0.1% benzene solution, of 1.12 [T. Otsu et al., *Makromol Chem.*, 71, 150 (1964)], 2.4 g of Ketjen Black KB-EC and 120 g of finely divided iodine. After pretreating the charge material as in Example 2, the flask reactor was placed in an oil bath, where it was heated for 5 hours at a temperature of 115° C. while stirring the charge material. There was thus obained a black composition having a conductivity $\sigma$ (S cm$^{-1}$) at room temperature of $4 \times 10^{-2}$ S cm$^{-1}$, while the iodine content of this composition was 89% by weight.

EXAMPLE 7

Twelve grams of powdery vinylpyrrolidone having an average molecular weight of 163,000, 2.4 g of Ketjen Black KB-EC and 120 g of finely divided iodine were charged to a 150-ml 4-necked flask shown in FIG. 9 and pretreated as in Example 2. After placing the flask reactor in an oil bath, it was heated for 5 hours at a temperature of 115° C. while stirring the charge material. There was thus obtained a black composition having a conductivity $\sigma$ (S cm$^{-1}$) at room temperature of $1.5 \times 10^{-1}$ S cm$^{-1}$. The iodine content of this composition was 88% by weight.

EXAMPLE 8

Twelve grams of powdery nylon-6 was dissolved in a formic acid solution, after which 2.4 g of Ketjen Black KB-EC was added to the resulting solution and well dispersed therein. This solution was cast on a glass plate, and the formic acid was removed by spontaneous evaporation to give a film. This film was impregnated with iodine by dipping it in an acetone solution of iodine. The conductivity $\sigma$ (S cm$^{-1}$) at room temperature of the thus obtained composition was $5 \times 10^{-2}$ S cm$^{-1}$, and its iodine content was 53% by weight.

Composite films of nylon-6, Ketjen Black KB-EC and iodine whose iodine contents were 10%, 20% and 30% by weight were obtained by the same technique (impregnation method). The conductivities $\sigma$ (S cm$^{-1}$) of the films obtained were respectively $7.8 \times 10^{-1}$ S cm$^{-1}$, $6.5 \times 10^{-1}$ S cm$^{-1}$ and $6.2 \times 10^{-1}$ S cm$^{-1}$.

EXAMPLE 9

Eight parts by weight of polyacrylonitrile having an average molecular weight of 152,000 was dissolved in dimethylformamide, after which 2 parts by weight of Ketjen Black KB-EC was added and well dispersed therein. The dimethylformamide was removed by evaporation to give a black composition. After comminuting 10 parts of the so obtained composition, it was severally placed in 150-ml 4-necked flasks along with 8 parts to 72 parts by weight of iodine. The flasks were then stoppered under reduced pressure, after which the charge materials were mixed with stirring at a temperature of 140° C. The iodine was thus mixed and dispersed to give iodine-containing conductive resin compositions A of this invention having differing iodine contents.

The conductivities $\sigma$ (S cm$^{-1}$) at room temperature (25° C.) of these compositions are shown in FIG. 1.

By way of comparison, compositions B that were prepared in the same manner but without adding the Ketjen Black were measured in like manner. The results obtained in this case are shown together in FIG. 1.

EXAMPLE 10

7.2 Parts by weight of polyvinyl alcohol and 0.8 part by weight of CYMEL 303 (a registered tradename for a polymelamine resin produced by Mitsui Toatsu Chemicals, Inc.) were dissolved in water. To the resulting solution was added 2 parts by weight of Ketjen Black KB-EC and well dispersed therein. The water was removed by evaporation to give a black composition. After comminuting this composition, it was charged severally to 150-ml 4-necked flasks along with 8 parts to 72 parts by weight of iodine. The flasks were then stoppered under reduced pressure, after which the charge materials were rendered into a molten state at a temperature of 140° C. with stirring. The iodine was thus mixed and dispersed to give iodine-containing conductive resin compositions A of this invention having differing iodine contents.

Figure 2:
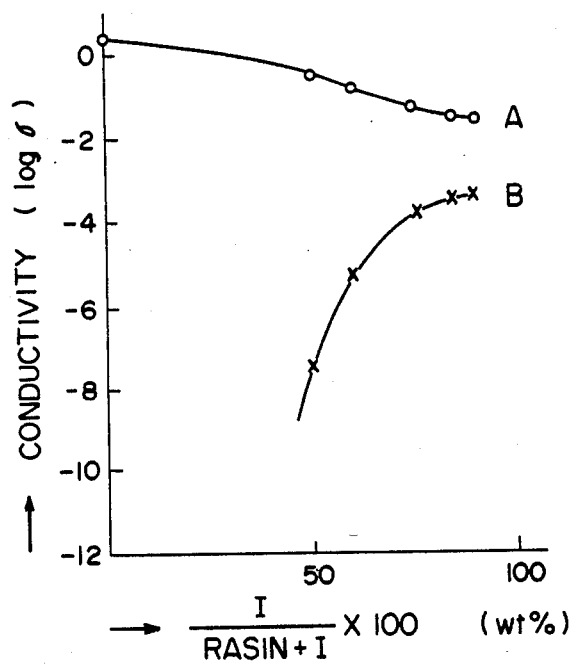

The conductivities $\sigma$ (S cm$^{-1}$) at room temperature (25° C.) of these compositions are shown in FIG. 2. By way of comparison, the results obtained in the case of compositions B that were prepared in like manner but without adding Ketjen Black are shown together in FIG. 2.

EXAMPLE 11

Nylon-6 (8 parts by weight) was dissolved in formic acid, after which 2 parts by weight of Ketjen Black KB-EC was added to the resulting solution and well dispersed therein. The formic acid was then removed by evaporation to yield a black composition. After comminuting this composition, it was severally charged to 150-ml 4-necked flasks along with 8 parts to 72 parts by weight of iodine. The flasks were then stoppered under reduced pressure, after which the charge materials were rendered into a molten state at a temperature of 115° C. with stirring. The iodine was thus mixed and dispersed to give iodine-containing conductive resin compositions A of this invention whose iodine contents were varied.

Figure 3:
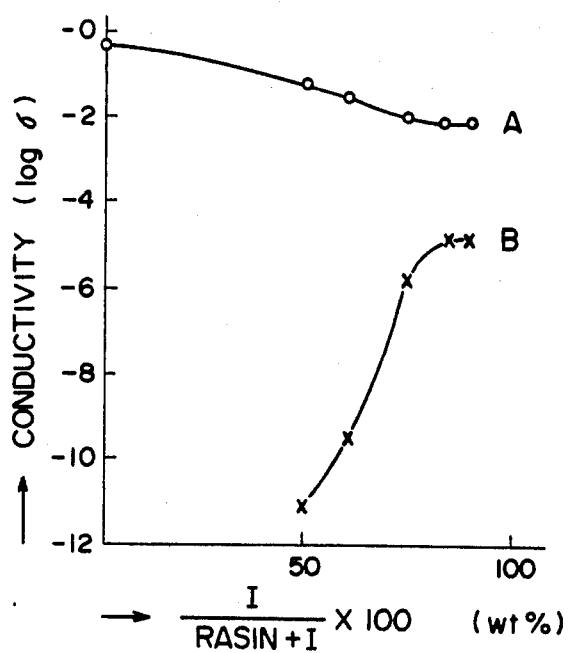

The conductivities $\sigma$ (S cm$^{-1}$) at room temperature (25° C.) of these compositions A are shown in FIG. 3.

By way of comparison, the results obtained in the case of compositions B prepared in the same manner but without adding Ketjen Black are shown together in FIG. 3.

EXAMPLE 12

Eight parts by weight of polymethyl methacrylate having an average molecular weight of 152,000 was dissolved in ethyl acetate, after which 2 parts by weight of Ketjen Black KB-EC was added to the resulting solution and well dispersed therein. The ethyl acetate was removed by evaporation to give a black composition. After comminuting this composition, it was charged severally to 150-ml 4-necked flasks along with 8 parts to 72 parts by weight of iodine. The flasks were then stoppered under reduced pressure. The charge materials were rendered into a molten state at a temperature of 115° C. with stirring to disperse the iodine. There were thus obained iodine-containing conductive resin compositions A of this invention having varying iodine contents.

Figure 4:
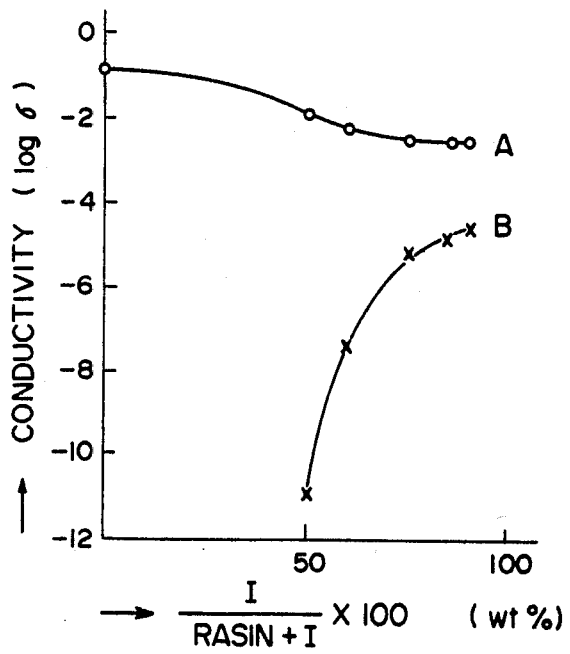

The conductivities $\sigma$ (S cm$^{-1}$) at room temperature (25° C.) of the compositions A are shown in FIG. 4.

By way of comparison, the results obtained in the case of compositions B that were prepared in the same manner but without adding Ketjen Black are shown together in FIG. 4.

EXAMPLE 13

Eight parts by weight of polyvinyl pyrrolidone having an average molecular weight of 163,000 was dissolved in tetrahydrofuran, and to the resulting solution was added 2 parts by weight of Ketjen Black KB-EC and well dispersed therein. The tetrahydrofuran was then removed by evaporation to give a black composition. After comminuting this composition, it was charged severally to 150-ml 4-necked flasks along with 2 parts to 72 parts by weight of iodine. The flasks were stoppered under reduced pressure, after which the charge materials were rendered into a molten state at a temperature of 115° C. with stirring to disperse the iodine. There were thus obtained iodine-containing conductive resin compositions A of this invention having differing iodine contents.

Figure 5:
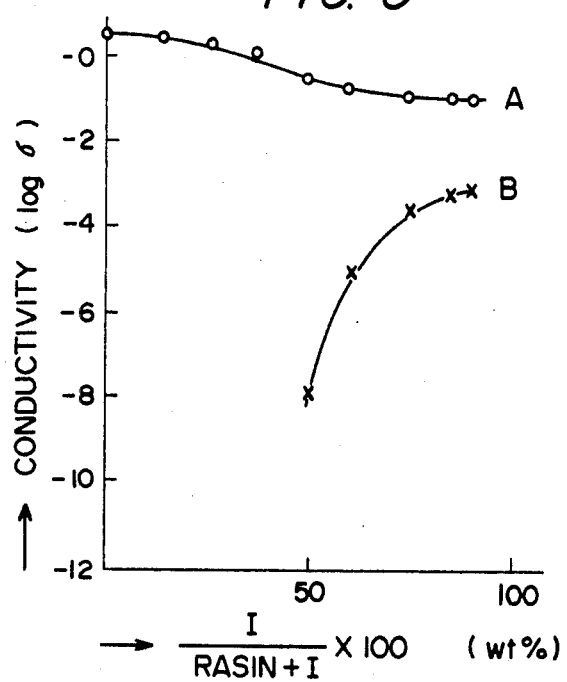

The conductivities $\sigma$ (S cm$^{-1}$) at room temperature (25° C.) of the compositions A are shown in FIG. 5.

By way of comparison, the results obtained in the case of compositions B that were obtained in the same manner but without adding Ketjen Black are shown together in FIG. 5.

EXAMPLE 14

Eight parts by weight of poly-2-vinylpyridine having an average molecular weight of 80,000 was dissolved in tetrahydrofuran, and to the resulting solution was added 2 parts by weight of Ketjen Black KB-EC and well dispersed therein. The tetrahydrofuran was then removed by evaporation to give a black composition. After comminuting this composition, it was charged severally along with 1 to 72 parts by weight of iodine to 150-ml 4-necked flasks. The flasks were then stoppered under reduced pressure, and the charge materials were rendered into a molten state at a temperature of 115° C. with stirring to disperse the iodine. There were thus obtained iodine-containing conductive compositions A of this invention having differing iodine contents.

Figure 6:
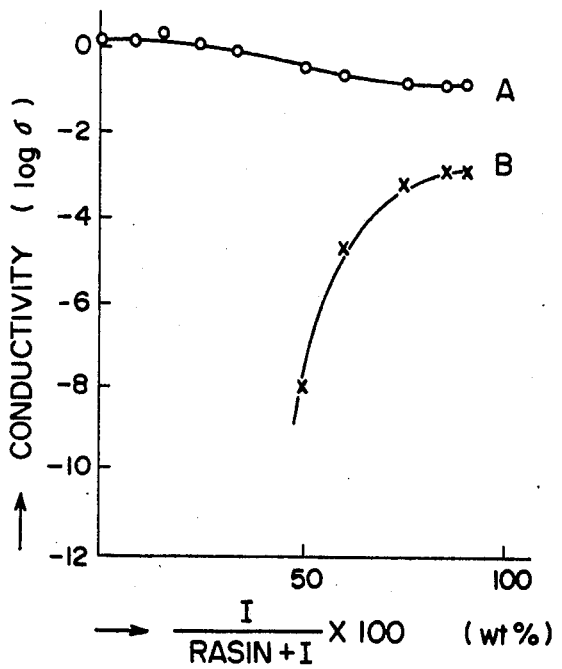

The conductivities $\sigma$ (S cm$^{-1}$) of these compositions at room temperature (25° C.) are shown in FIG. 6.

By way of comparison, the results obtained in the case of compositions B prepared in like manner but without adding Ketjen Black are shown together in FIG. 6.

EXAMPLE 15

Eight parts by weight of polytetramethylene ether having a reduced viscosity, as measured on its 0.1% benzene solution, of 1.12 [T. Otsu et al., *Makromol Chem.*, 71, 150 (1964)] was dissolved in ethyl cellosolve acetate, and to the resulting solution was added 2 parts by weight of Ketjen Black KB-EC and well dispersed therein. The ethyl cellosolve acetate was then removed by evaporation to give a black composition. After comminuting this composition, it was severally charged along with 1 to 72 parts of iodine to 150-ml 4-necked flasks. The flasks were then stoppered under reduced pressure, and the charge materials were rendered into a molten state at a temperature of 115° C. with stirring to disperse the iodine. There were thus obtained iodine-containing conductive resin compositions A of this invention whose iodine contents were varied.

Figure 7:
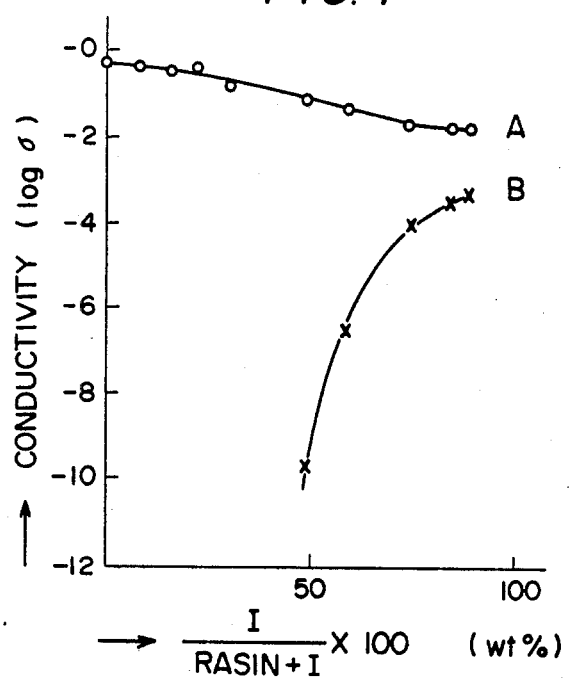

The conductivities $\sigma$ (S cm$^{-1}$) at room temperature (25° C.) of the compositions A are shown in FIG. 7. By way of comparison, the results obtained in the case of compositions B prepared in like manner but without adding Ketjen Black are shown together in FIG. 7.

EXAMPLE 16

A polyurethane synthesized from 4.2 parts by weight of tolylene diisocyanate (TDI-80/20) (a product of Mitsui Nisso Urethane Co., Ltd.) and 3.8 parts by weight of tripropylene glycol was dissolved in phenol, and to the resulting solution was added 2 parts by weight of Ketjen Black KB-EC and well dispersed therein. The phenol was then removed by evaporation to give a black composition. After comminuting this composition, it was severally charged along with 8 to 72 parts by weight of iodine to 150-ml 4-necked flasks. The flasks were then stoppered under reduced pressure, and the charge materials were rendered into a molten state at a temperature of 150° C. with stirring to disperse the iodine and give iodine-containing conductive resin compositions A of this invention whose iodine contents were varied.

Figure 8:
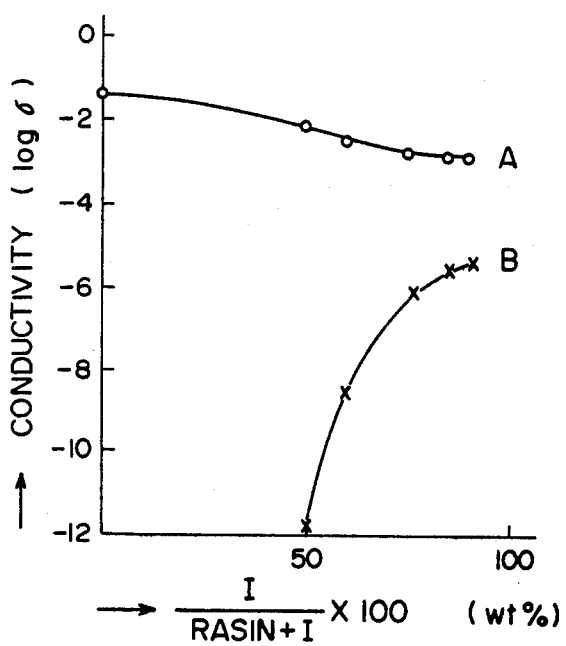

The conductivities $\sigma$ (S cm$^{-1}$) at room temperature (25° C.) of the compositions A are shown in FIG. 8. By way of comparison, the results obtained in the case of compositions B that were prepared in the same manner but without the addition of Ketjen Black are shown together in FIG. 8.

As is apparent from the examples given hereinbefore, the iodine-containing conductive resin composition of this invention is characterized by its possession of high conductivity with hardly no change due to a change in the amount of iodine contained.

This effect becomes most evident in the case especially where the composition is one whose content of iodine is small. It is thus a very desirable characteristic when the invention composition is to be applied to positive electrode materials of cells or electrolytic capacitors.

On the other hand, in the case of a resin composition not incorporated with carbon, not only is the conductivity low even when the content of iodine is high, but there is also an abrupt drop in conductivity as the content of iodine becomes low. It can thus be seen that much difficulty is experienced in applying such a composition to the positive electrode materials of cells and storage cells or electrolytic capacitors.

EXAMPLE 17

24 g of polyacrylonitrile having an average molecular weight of 152,000 was dissolved in dimethylformamide, and to the resulting solution was added 6 g of Ketjen Black KB-EC and well dispersed therein. The dimethylformamide was removed by evaporation to give a black composition. After comminuting 30 g of this composition, it was placed in a 150-ml 4-necked flask along with 30 g of iodine. The flask was then stoppered under reduced pressure, and the charge material was rendered into a mixed state at a temperature of 140° C. with stirring to effect the mixing and dispersion of the iodine and give an iodine-containing resin composition of this invention.

The so obtained composition (600 mg) was coated on a carbon fiber disc (E-715, a product of Kureha Chemical Industry Co., Ltd.) having a diameter of 4.5 cm. This was used as the positive electrode. A 0.3-mm-thick sheet zinc (a product of MITSUI MINING & SMELTING CO. LTD.) was used as the negative electrode.

A 1 mole/liter aqueous solution of $NH_4Cl$ was used as the electrolytic solution. Two glass fiber filter sheets were impregnated with 2 ml of the electrolytic solution, and as a separator a cation exchange membrane CMV membrane (a product of Asahi Glass Co., Ltd.) was sandwiched between the two filter sheets. A cell was built by interposing the foregoing assembly between the two electrodes.

The experiment was conducted under a stream of nitrogen at 25° C. On measurement of the initial short circuit current ($I_{sc}$) at the time of dicharge, it was found to be 76 mA/cm$^2$. And the open-circuit voltage at this time was 1.35 volts. When this cell was discharged at a fixed current of 1 mA, it was possible to carry out the discharge for 50 hours before the voltage dropped to 0.9 volt.

On the other hand, when a charging-discharging test, whose one cycle consists of 15 hours of initial discharging time from 1.35 volts to 0.9 volt at a fixed current of 2 mA and 15 hours of initial charging time from 0.9 volt to 1.5 volts at a fixed current of 2 mA, was conducted, it was found that the charging and discharging could be carried out for at least 300 cycles.

It is thus seen that this cell can not only be used as a primary cell but also as a secondary cell.

By way of comparison, a cell was built following the same procedures as described hereinbefore but using a positive electrode materials in which Ketjen Black KB-EC was not added. This cell was evaluated under identical conditions. On measurement of the initial short circuit current ($I_{sc}$) of this cell at the time of its discharge, it was 8 mA/cm$^2$, and the open-circuit voltage at this time was 1.35 volts. The charging-discharging test was also conducted, but charging could not be carried out, because the rise in the voltage was so acute when charging was attempted.

Utilizability in Industry

The iodine-containing resin composition of this invention not only possesses superior conductivity but also this conductivity hardly changes at all with the changes in the amount of iodine contained. In addition, the invention composition possesses superior moldability, since it is constituted predominantly of plastics. Hence, this composition finds applications suitably in various areas such as positive electrode materials, electrolytic capacitors, conductive films, conductive plastic sheets, radio wave shielding materials, etc.

What is claimed is:

1. An iodine-containing conductive resin composition which comprises: (i) a complex adduct of iodine and a polymer capable of forming a complex adduct with iodine, the content of said iodine being 1 to 95 percent by weight based on the total weight of said composition, said polymer being selected from the group consisting of a polyamide, a poly(meth)acrylamide, a polyurethane, a polyvinyl alcohol, a polyether and a blend of two or more of such polymers, and (ii) 0.5 to 60 percent by weight, based on the total weight of polymer and carbon, of carbon selected from the group consisting of carbon black, acetylene black, graphite and Ketjen Black, said carbon being dispersed in said complex adduct.

2. The composition as claimed in claim 1 wherein said carbon is one in a readily dispersible form.

3. The composition as claimed in claim 2 wherein said carbon is in the form of a powder, flakes or short fibers.

* * * * *